United States Patent
Yoshioka et al.

(10) Patent No.: US 12,425,969 B2
(45) Date of Patent: Sep. 23, 2025

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 496 days.

(21) Appl. No.: 17/910,191

(22) PCT Filed: Mar. 19, 2020

(86) PCT No.: PCT/JP2020/012530
§ 371 (c)(1),
(2) Date: Jan. 3, 2023

(87) PCT Pub. No.: WO2021/186730
PCT Pub. Date: Sep. 23, 2021

(65) Prior Publication Data
US 2023/0247554 A1 Aug. 3, 2023

(51) Int. Cl.
*H04W 52/02* (2009.01)

(52) U.S. Cl.
CPC ..... *H04W 52/0232* (2013.01); *H04W 52/028* (2013.01)

(58) Field of Classification Search
CPC . H04W 52/0232; H04W 52/028; H04W 4/40; H04W 52/00; H04W 52/02; H04W 52/0216; H04W 52/0229; H04W 52/0235; H04W 72/04; H04W 92/18; Y02D 30/70
See application file for complete search history.

(56) References Cited

U.S. PATENT DOCUMENTS

| | | | |
|---|---|---|---|
| 11,564,170 B2* | 1/2023 | Zhang | H04W 72/23 |
| 2019/0174411 A1 | 6/2019 | Xu et al. | |
| 2020/0037247 A1* | 1/2020 | Liao | H04W 52/0216 |
| 2020/0351780 A1* | 11/2020 | Liao | H04W 76/28 |
| 2021/0058866 A1* | 2/2021 | Hosseini | H04B 7/0413 |
| 2022/0182938 A1* | 6/2022 | Ye | H04W 76/28 |

FOREIGN PATENT DOCUMENTS

| | | |
|---|---|---|
| JP | 2019525607 A | 9/2019 |
| WO | WO-2020068253 A2 * | 4/2020 ............. H04L 12/12 |

OTHER PUBLICATIONS

International Search Report issued in PCT/JP2020/012530 on Oct. 6, 2020 (3 pages).
Written Opinion of the International Searching Authority issued in PCT/JP2020/012530 on Oct. 6, 2020 (3 pages).
(Continued)

*Primary Examiner* — Mohamed A Kamara
(74) *Attorney, Agent, or Firm* — Osha Bergman Watanabe & Burton LLP

(57) ABSTRACT

A terminal includes a reception unit that monitors an activation signal at a monitoring occasion periodically configured during DRX (Discontinuous Reception), and a control unit that determines, based on a monitoring result of the activation signal, whether or not to monitor a control signal transmitted from another terminal during DRX on-duration starting after passage of an offset period from a time point of the activation signal.

5 Claims, 13 Drawing Sheets

(56) References Cited

OTHER PUBLICATIONS

Huawei, HiSilicon; "Further discussion on the impact of PDCCH-WUS"; 3GPP TSG-RAN2 Meeting#107bis, R2-1913787; ChongQing, China; Oct. 14-18, 2019 (6 pages).
Huawei, HiSilicon; "Discussion on sidelink power control"; 3GPP TSG RAN1 Meeting #89, R1-1707036; Hangzhou, China; May 15-19, 2017 (3 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
3GPP TS 38.211 V16.0.0; "3rd Generation Partnership Project; Technical Specification Group Radio Access Network; NR; Physical channels and modulation (Release 16)"; Dec. 2019 (129 pages).
Office Action issued in counterpart Japanese Application No. 2022-508014, mailed Mar. 12, 2024 (5 pages).
Vivo: "Views on general NR sidelink enhancements in Rel-17", 3GPP Tsg Ran Meeting #86, RP-192542; Sitges, ES, Dec. 9 - 12, 2019 (5 pages).

\* cited by examiner

TERMINAL AND COMMUNICATION METHOD

TECHNICAL FIELD

The present invention relates to a terminal and a communication method in a radio communication system.

BACKGROUND ART

In LTE (Long Term Evolution) and a successor system of the LTE (for example, LTE-A (LTE-Advanced) and NR (New Radio) (which is also referred to as 5G)), D2D (Device to Device) techniques where terminals conduct direct communication with each other without involving a base station are being discussed (for example, non-patent document 1).

The D2D reduces traffic between terminals and base stations, and even if the base stations are unable to perform communications in the event of, for example, disasters, the D2D enables communication between the terminals. Note that although the D2D is referred to as "sidelink" in 3GPP ($3^{rd}$ Generation Partnership Project), the D2D is used as a more general term in the present specification. However, the sidelink may be used in descriptions of embodiments as stated below if necessary.

The D2D communication is broadly divided into: D2D discovery for discovering other terminals capable of communication; and D2D communication (also referred to as D2D direct communication, D2D communication, direct communication between terminals or the like) for direct communication between terminals. In the following, when the D2D communication, the D2D discovery, and the like, are not particularly distinguished, they are simply referred to as D2D. Also, signals transmitted and received in the D2D are referred to as D2D signals. Various use cases of services associated with V2X (Vehicle to Everything) in the NR are being discussed (for example, non-patent document 2).

RELATED ART DOCUMENTS

Non-Patent Documents

[Non-Patent Document 1] 3GPP TS 38.211 V16.0.0 (2019-12)
[Non-Patent Document 2] 3GPP TR 22.886 V15.1.0 (2017-03)

SUMMARY OF INVENTION

Problem to be Solved by the Invention

In LTE and NR, in a case where data communication for terminals is not performed, DRX (Discontinuous Reception) for reduction in power consumption can be applied. The DRX includes DRX for idle time and CDRX for connected time (connected DRX). Furthermore, a WUS (Wake-Up Signal) for triggering monitoring of a PDCCH is being discussed for the purpose of power saving of a UE corresponding to an IoT-UE (User Equipment) for the LTE, that is, a NB-IoT (Narrow Band IoT) or an eMTC (enhanced Machine Type Communication), for example.

Also in direct communication between terminals in the NR, power saving to which the DRX and the WUS are applied is being discussed. Meanwhile, no detailed method has been specified thus far for power saving in which the DRX and the WUS are applied to sidelink.

In the light of the above problem, the present invention aims to control power consumed during execution of the DRX (Discontinuous Reception) in a radio communication system.

Means for Solving the Problem

According to a technique disclosed herein, there is provided a terminal, including: a reception unit that monitors an activation signal at a monitoring occasion periodically configured during DRX (Discontinuous Reception); and a control unit that determines, based on a monitoring result of the activation signal, whether or not to monitor a control signal transmitted from another terminal during DRX on-duration starting after passage of an offset period from a time point of the activation signal.

Advantage of the Invention

According to the disclosed technique, the present invention aims to control power consumed during execution of the DRX (Discontinuous Reception) in a radio communication system.

EMBODIMENTS OF THE INVENTION

Hereinafter, embodiments of the present invention will be described with reference to the drawings. The embodiments described below are merely examples, and embodiments to which the present invention is applied are not limited to the following embodiments.

In operations of a radio communication system of an embodiment of the present invention, conventional techniques are used as needed. Note that the conventional techniques are conventional LTE, for example, but are not limited to the conventional LTE. Also, unless specifically stated otherwise, it should be appreciated that the term "LTE" used herein has a broader meaning including LTE-Advanced, its subsequent schemes (e.g., NR) or a wireless LAN (Local Area Network).

Also, in embodiments of the present invention, a duplex scheme may be TDD (Time Division Duplex) scheme, FDD (Frequency Division Duplex) scheme or other schemes (e.g., flexible duplex scheme or the like).

Also, in embodiments of the present invention, "configuring" a radio parameter or the like may mean that a predetermined value is pre-configured or that a radio parameter indicated by a base station 10 or a terminal 20 is configured.

Figure 1:
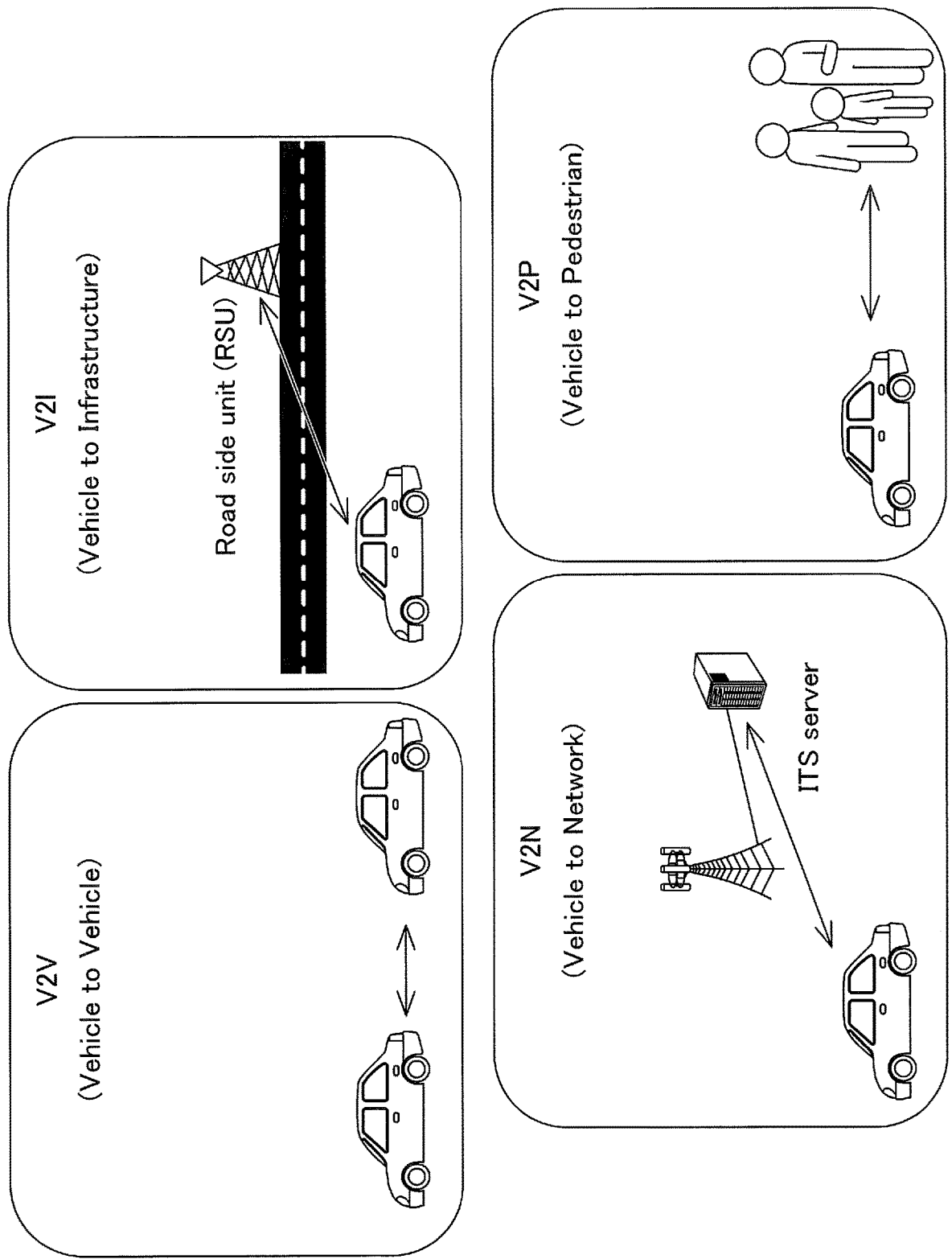
FIG. 1 is a diagram illustrating V2X.

FIG. 1 is a diagram illustrating V2X. In 3GPP, it is being discussed that V2X (Vehicle to Everything) or eV2X (enhanced V2X) will be implemented through enhancement of D2D functions, and the technical specifications are being developed. As illustrated in FIG. 1, the V2X is a part of ITS (Intelligent Transport Systems) and is a collective term for: V2V (Vehicle to Vehicle), which means the form of communication between vehicles; V2I (Vehicle to Infrastructure), which means the form of communication between a vehicle and a RSU (Road-Side Unit) located at a roadside; V2N (Vehicle to Network), which means the form of communication between a vehicle and an ITS server; and V2P (Vehicle to Pedestrian), which means the form of communication between a vehicle and a mobile terminal carried by a pedestrian.

Also, V2X utilizing cellular communication and inter-terminal communication of LTE or NR is being discussed in the 3GPP. The V2X utilizing cellular communication may be referred to as cellular V2X. In the V2X of the NR, implementations of large capacity, low delay, high reliability and QoS (Quality of Service) control are being discussed.

It is expected that, regarding the V2X of LTE or NR, discussions will be not limited to the 3GPP specifications in the future. For example, it is expected that interoperability, cost reduction by implementation of an upper layer, combination or switching methods of multiple RATS (Radio Access Technology), regulatory compliance in respective countries, data acquisition, distribution, database management and use of V2X platforms of LTE or NR will be discussed.

In embodiments of the present invention, although implementations of a communication device equipped to a vehicle are mainly assumed, the embodiments of the present invention are not limited to those embodiments. For example, the communication device may be a terminal carried by a person, a device equipped to a drone or an aircraft, a base station, an RSU, a relay node, a terminal having scheduling capabilities and so on.

Note that a SL (Sidelink) may be differentiated from an UL (Uplink) or a DL (Downlink), based on any of or combinations of 1) to 4) below. Also, the SL may be referred to as other names.
1) Resource arrangement in the time domain
2) Resource arrangement in the frequency domain
3) Synchronization signal that is referred to (including SLSS (Sidelink Synchronization Signal))
4) Reference signal for use in pathloss measurement for transmission power control Also, regarding OFDM (Orthogonal Frequency Division Multiplexing) of the SL or the UL, any of CP-OFDM (Cyclic-Prefix OFDM), DFT-S-OFDM (Discrete Fourier Transform-Spread-OFDM), OFDM without transform precoding or OFDM with transform precoding may be applied.

In the SL of the LTE, Mode 3 and Mode 4 regarding SL resource assignment to a terminal 20 are defined. In Mode 3, transmission resources are dynamically assigned by DCI (Downlink Control Information) transmitted from a base station 10 to the terminal 20. Also, SPS (Semi Persistent Scheduling) is also enabled in Mode 3. In Mode 4, the terminal 20 autonomously selects transmission resources from a resource pool.

Note that a slot according to an embodiment of the present invention may be replaced with a symbol, a mini-slot, a subframe, a radio frame or a TTI (Transmission Time Interval). Also, a cell according to an embodiment of the present invention may be replaced with a cell group, a carrier component, a BWP, a resource pool, a resource, a RAT (Radio Access Technology), a system (including a wireless LAN) or the like.

Note that in embodiments of the present invention, the terminal 20 is not limited to a V2X terminal may be any type of terminal that performs D2D communication. For example, the terminal 20 may be a terminal carried by a user such as a smartphone or an IoT (Internet of Things) device such as a smart meter.

Figure 2:
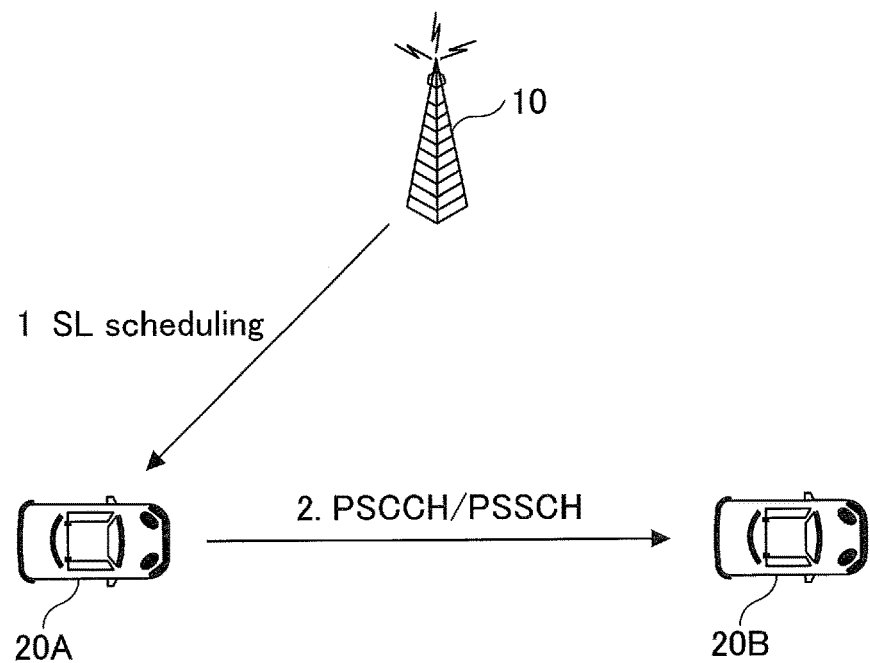
FIG. 2 is a diagram illustrating an example (1) of a transmission mode of the V2X.

FIG. 2 is a diagram illustrating an example (1) of a transmission mode for the V2X. In the transmission mode for sidelink communication illustrated in FIG. 2, at step 1, the base station 10 transmits a scheduling for a sidelink to the terminal 20A. Then, the terminal 20A transmits a PSCCH (Physical Sidelink Control Channel) and a PSSCH (Physical Sidelink Shared Channel) to the terminal 20B based on the received scheduling (step 2). The transmission mode of the sidelink communication illustrated in FIG. 2 may be referred to as sidelink transmission mode 3 for the LTE. In the sidelink transmission mode 3 for the LTE, Uu based sidelink scheduling is performed. The Uu means a radio interface between a UTRAN (Universal Terrestrial Radio Access Network) and a UE (User Equipment). Note that the transmission mode for the sidelink communication illustrated in FIG. 2 may be referred to as sidelink transmission mode 1 for the NR. The transmission mode may be referred to as resource assignment mode.

Figure 3:
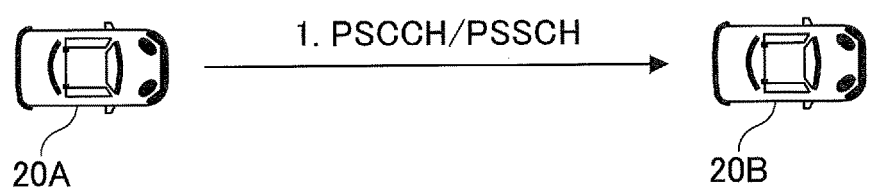
FIG. 3 is a diagram illustrating an example (2) of a transmission mode of the V2X.

FIG. 3 is a diagram illustrating an example (2) of a transmission mode for the V2X. In the transmission mode for the sidelink communication illustrated in FIG. 3, at step 1, the terminal 20A uses an autonomously selected resource to transmit a PSCCH and a PSSCH to the terminal 20B. The transmission mode for the sidelink communication illustrated in FIG. 3 may be referred to as sidelink transmission mode 4 for the LTE. In sidelink transmission mode 4 for the LTE, the UE itself performs resource selection.

Figure 4:
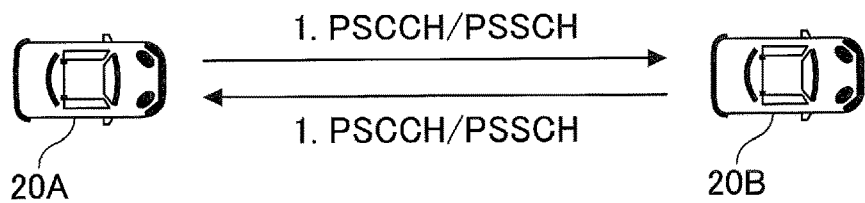
FIG. 4 is a diagram illustrating an example (3) of a transmission mode of the V2X.

FIG. 4 is a diagram illustrating an example (3) of a transmission mode for the V2X. In a transmission mode for the sidelink communication illustrated in FIG. 4, at step 1, the terminal 20A uses an autonomously selected resource to transmit a PSCCH and a PSSCH to the terminal 20B. Likewise, the terminal 20B uses an autonomously selected resource to transmit a PSCCH and a PSSCH to the terminal 20A (step 1). The transmission mode for the sidelink communication illustrated in FIG. 4 may be referred to as sidelink transmission mode 2a or sidelink resource assignment mode 2 for the NR. In the sidelink transmission mode 2 for the NR, the terminal 20 itself performs resource selection.

Figure 5:
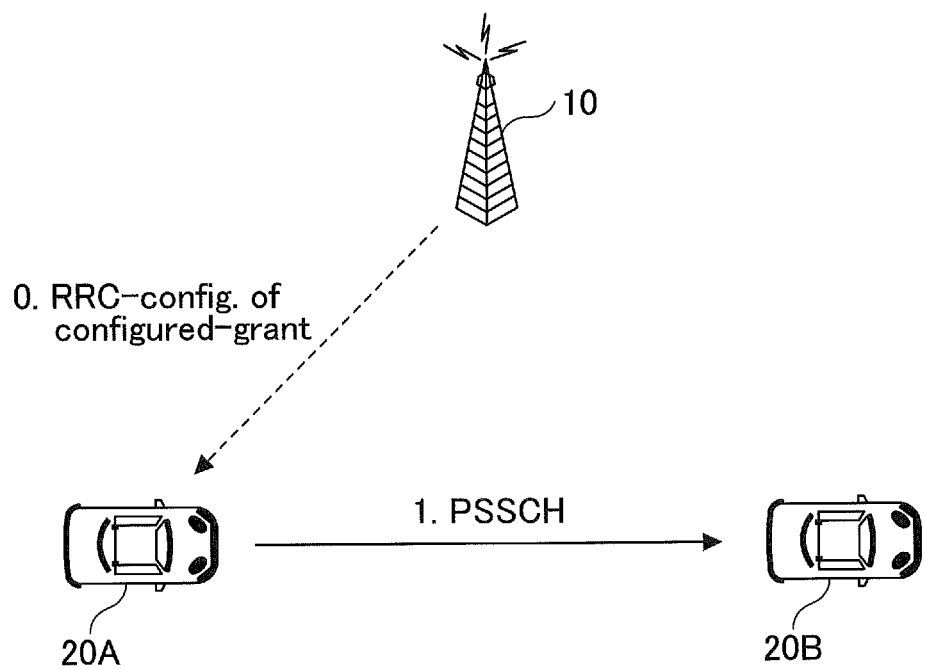
FIG. 5 is a diagram illustrating an example (4) of a transmission mode of the V2X.

FIG. 5 is a diagram illustrating an example (4) of a transmission mode for the V2X. In the transmission mode for the sidelink communication illustrated in FIG. 5, at step 0, the base station 10 transmits a sidelink grant to the terminal 20A via an RRC (Radio Resource Control) configuration. Then, the terminal 20A transmits a PSSCH to the terminal 20B based on the received resource pattern (step 1). The transmission mode for the sidelink communication illustrated in FIG. 5 may be referred to as sidelink transmission mode 2c for the NR.

Figure 6:
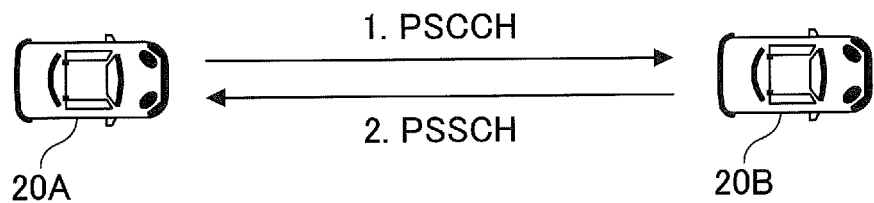
FIG. 6 is a diagram illustrating an example (5) of a transmission mode of the V2X.

FIG. 6 is a diagram illustrating an example (5) of a transmission mode for the V2X. In a transmission mode for the sidelink communication illustrated in FIG. 6, at step 1, the terminal 20A transmits a sidelink scheduling to the terminal 20B via a PSCCH. Then, the terminal 20B transmits a PSSCH to the terminal 20A based on the received scheduling (step 2). The transmission mode for the sidelink communication illustrated in FIG. 6 may be referred to as sidelink transmission mode 2d for the NR.

Figure 7:
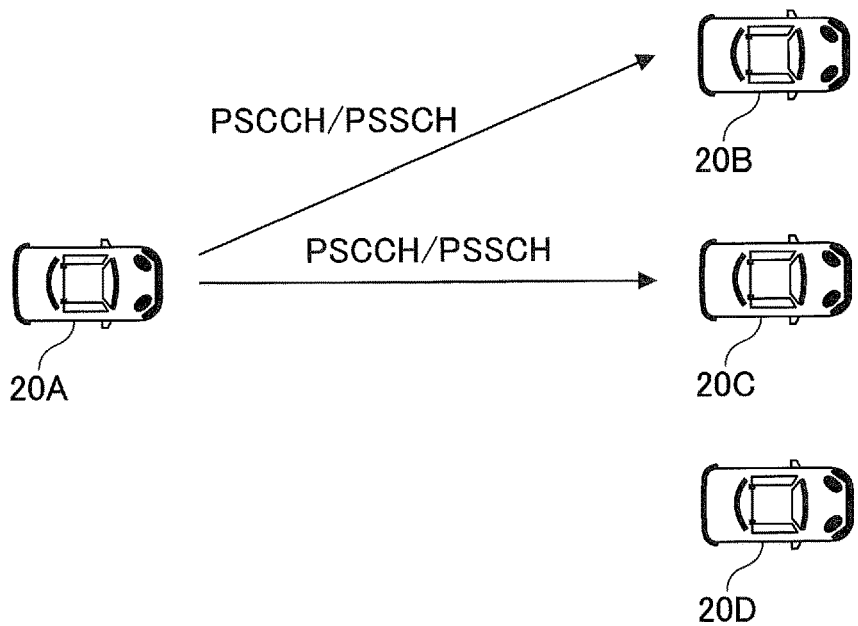
FIG. 7 is a diagram illustrating an example (1) of a communication type of the V2X.

FIG. 7 is a diagram illustrating an example (1) of a communication type of the V2X. The sidelink communication type illustrated in FIG. 7 is a unicast. The terminal 20A transmits a PSCCH and a PSSCH to the terminal 20. In the example illustrated in FIG. 7, the terminal 20A performs unicast for the terminal 20B and also performs a unicast for the terminal 20C.

Figure 8:
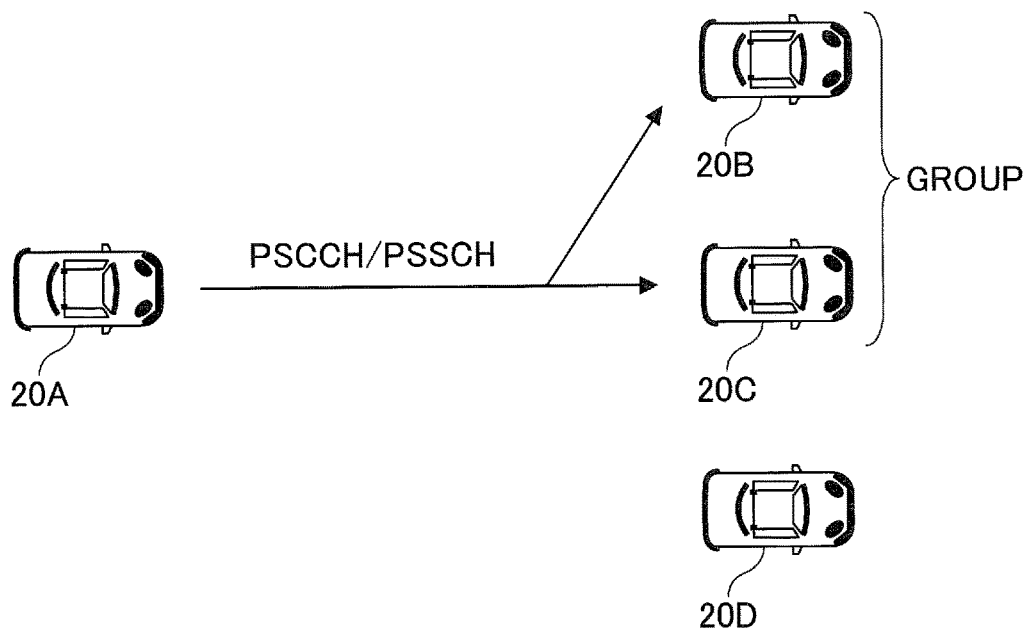
FIG. 8 is a diagram illustrating an example (2) of a communication type of the V2X.

FIG. 8 is a diagram illustrating an example (2) of a communication type for the V2X. The sidelink communication type illustrated in FIG. 8 is a groupcast. The terminal 20A transmits a PSCCH and a PSSCH to a group to which one or more terminals 20 belong. In the example illustrated in FIG. 8, the group includes the terminals 20B and 20C, and the terminal 20A performs a groupcast to the group.

Figure 9:
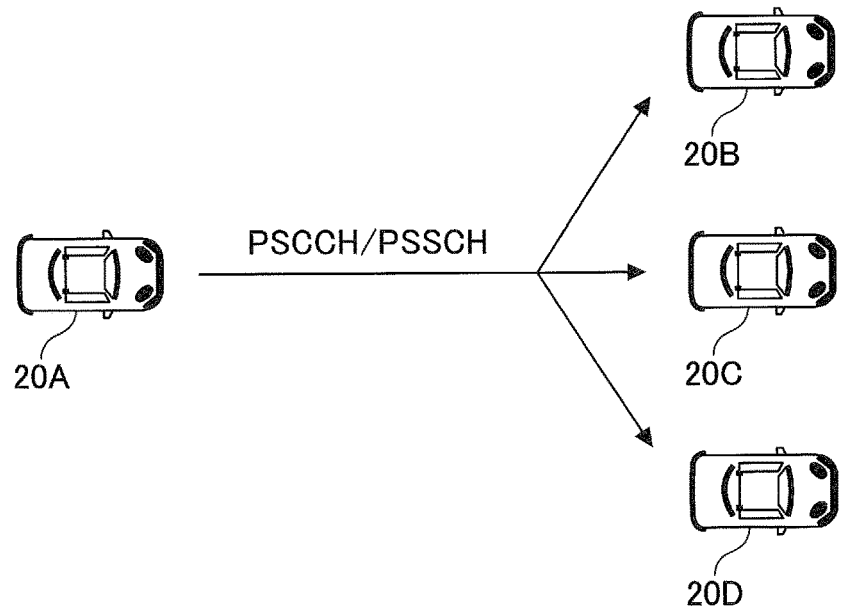
FIG. 9 is a diagram illustrating an example (3) of a communication type of the V2X.

FIG. 9 is a diagram illustrating an example (3) of a communication type for the V2X. The sidelink communication type illustrated in FIG. 9 is a broadcast. The terminal 20A transmits a PSCCH and a PSSCH to one or more terminals 20. In the example illustrated in FIG. 9, the terminal 20A performs a broadcast to the terminals 20B, 20C, and 20D. Note that the terminal 20A illustrated in FIGS. 7 to 9 may be referred to as a header UE.

Also, it is assumed in NR-V2X that a HARQ (Hybrid Automatic Repeat Request) is supported for the sidelink unicast and groupcast. In addition, SFCI (Sidelink Feedback Control Information) including a HARQ response is defined in the NR-V2X. In addition, it is being discussed that the SFCI is transmitted via a PSFCH (Physical Sidelink Feedback Channel).

Although the PSFCH is used for sidelink transmission of a HARQ-ACK in descriptions below, it is merely an example. For example, a PSCCH may be used to transmit the sidelink HARQ-ACK, a PSSCH may be used to transmit the sidelink HARQ-ACK or other channels may be used to transmit the sidelink HARQ-ACK.

In the following, in general, information reported by the terminal 20 in HARQs is referred to as the HARQ-ACK for convenience. The HARQ-ACK may be referred to as HARQ-ACK information. Also, more specifically, a codebook applied to the HARQ-ACK information reported from the terminal 20 to the base station 10 or the like, is referred to as a HARQ-ACK codebook. The HARQ-ACK codebook specifies bit sequences of the HARQ-ACK information. Note that not only a NACK but also the ACK is transmitted in the HARQ-ACK.

Figure 10:
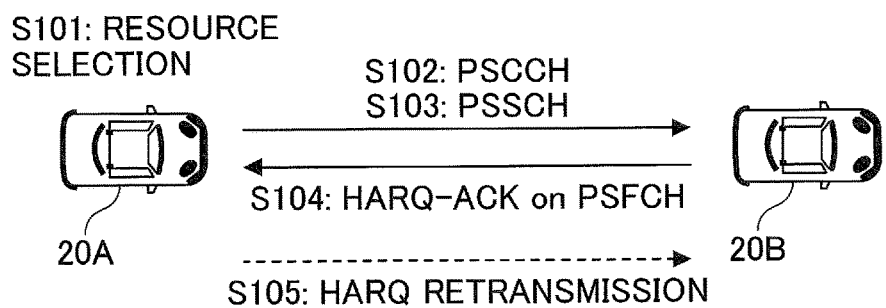
FIG. 10 is a sequence diagram illustrating an operation example (1) of the V2X.

FIG. 10 is a diagram illustrating an example (1) of arrangement and operation of a radio communication system according to an embodiment of the present invention. As illustrated in FIG. 10, the radio communication system according to an embodiment of the present invention has terminals 20A and 20B. Note that although a large number of user equipments are actually present, the terminals 20A and 20B are illustrated in FIG. 10 as examples.

In the following, if the terminals 20A, 20B and so on are not particularly distinguished, they are simply described as "terminal 20" or "user equipment". Although the case where both the terminals 20A and 20B are within a coverage of a cell is illustrated in FIG. 10, the operation according to an embodiment of the present invention may be also applied to the case where the terminal 20B is out of the coverage.

As stated above, in the present embodiment, the terminal 20 is a device equipped to a vehicle such as a car, for example, and has cellular communication functions and sidelink functions as a UE in the LTE or the NR. The terminal 20 may be a typical mobile terminal (such as a smartphone). Also, the terminal 20 may be an RSU. The RSU may be a UE-type RSU having UE functions or a gNB-type RSU having functions of a base station apparatus.

Note that the terminal 20 is not necessarily a device of a single housing, and even if various sensors are distributed and installed in a vehicle, for example, the device including these sensors is the terminal 20.

Also, processing contents at the terminal 20 for sidelink transmission data are basically similar to those of UL transmission for the LTE or the NR. For example, the terminal 20 scrambles and modulates a codeword of transmission data to generate complex-valued symbols and maps the complex-valued symbols (transmission signal) to one or two layers for precoding. Then, the terminal 20 maps the precoded complex-valued symbols to a resource element to generate a transmission signal (for example, a complex-valued time-domain SC-FDMA signal) and transmits it from each antenna port.

Note that the base station 10 has cellular communication functions to serve as a base station for the LTE or the NR and functions that enable communications of the terminal 20 according to the present embodiment (for example, resource pool configuration, resource assignment or the like). Also, the base station 10 may be an RSU (a gNB-type RSU).

Also, a signal waveform utilized by the terminal 20 in the SL or the UL in the radio communication system according to an embodiment of the present invention may be OFDMA, SC-FDMA or others.

At step S101, the terminal 20A autonomously selects a resource used for a PSCCH and a PSSCH from a resource selection window having a predetermined period. The resource selection window may be configured to the terminal 20 by the base station 10.

At steps S102 and S103, the terminal 20A uses the resource autonomously selected at step S101 to transmit SCI (Sidelink Control Information) via a PSCCH and SL data via a PSSCH. For example, the terminal 20A may use a frequency resource adjacent to a frequency resource of the PSSCH with the same time resource as a time resource of the PSSCH to transmit the SCI (PSCCH).

The terminal 20B receives the SCI (PSCCH) and the SL data (PSSCH) transmitted from the terminal 20A. The SCI received via the PSCCH may include information for a resource of a PSFCH used by the terminal 20B for transmission of a HARQ-ACK corresponding to reception of the data. The terminal 20A may include the information for the autonomously selected resource in the SCI, and then transmit the SCI.

At step S104, the terminal 20B uses the PSFCH resource indicated by the received SCI to transmit the HARQ-ACK for the received data to the terminal 20A.

At step S105, in a case where the HARQ-ACK received at step S104 indicates a request for retransmission, that is, a NACK (negative response), the terminal 20A retransmits the PSCCH and the PSSCH to the terminal 20B. The terminal 20A may use the autonomously selected resource to retransmit the PSCCH and the PSSCH.

Note that if the HARQ control is not performed, steps S104 and S105 need not be performed.

Figure 11:
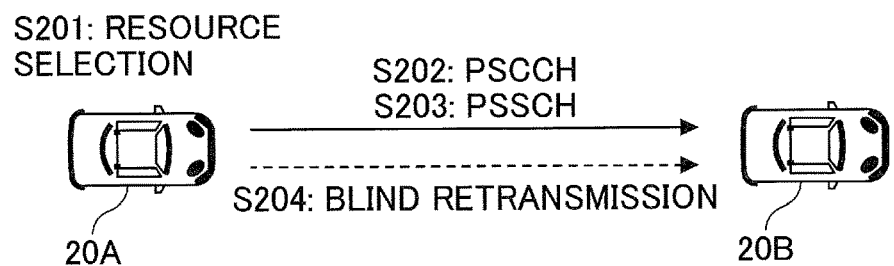
FIG. 11 is a sequence diagram illustrating an operation example (2) of the V2X.

FIG. 11 is a diagram illustrating an example (2) of arrangement and operation of the radio communication system according to an embodiment of the present invention. Blind retransmission that does not rely on the HARQ control may be performed so as to improve a success rate of transmission or improve a reachable distance.

At step S201, the terminal 20A autonomously selects a resource to be used for a PSCCH and a PSSCH from a resource selection window having a predetermined period. The resource selection window may be configured to the terminal 20 by the base station 10.

At steps S202 and S203, the terminal 20A uses the resource autonomously selected at step S201 to transmit SCI via PSCCH and SL data via PSSCH. For example, the terminal 20A may use a frequency resource adjacent to a frequency resource of the PSSCH with the same time resource as a time resource of the PSSCH to transmit the SCI (PSCCH).

At step S204, the terminal 20A uses the resource autonomously selected at step S201 to retransmit the SCI via PSCCH and the SL data via PSSCH to the terminal 20B. The retransmission at step S204 may be performed multiple times.

Note that if the blind retransmission is not performed, step S204 need not be performed.

Figure 12:
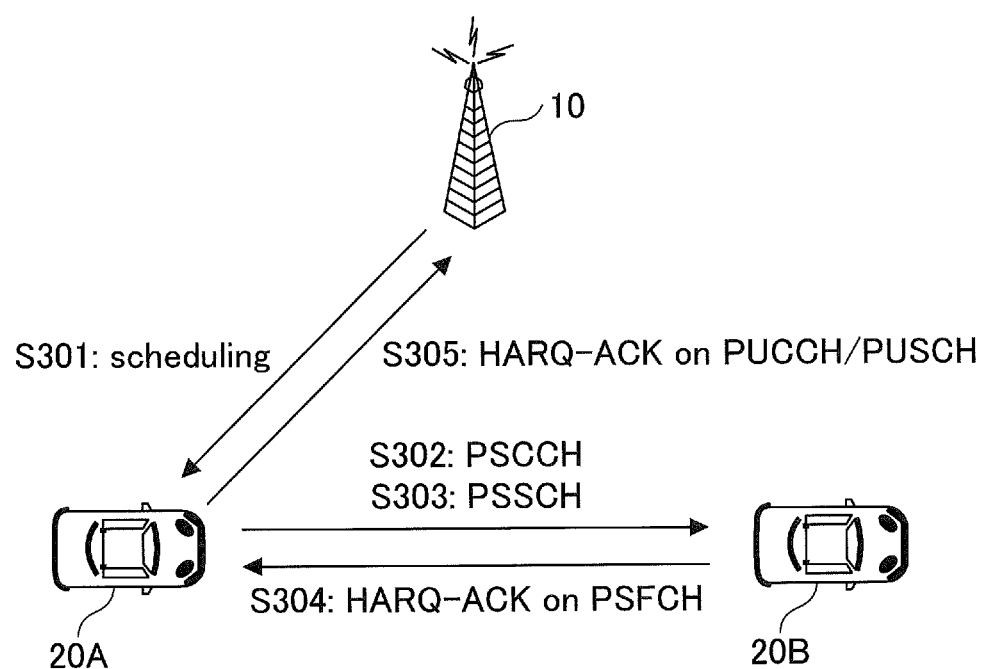
FIG. 12 is a is a sequence diagram illustrating an operation example (3) of the V2X.

FIG. 12 is a diagram illustrating an example (3) of arrangement and operation of the radio communication system according to an embodiment of the present invention. The base station 10 may perform a scheduling for sidelink. In other words, the base station 10 may determine a resource to be used for sidelink by the terminal 20 and transmit information indicating the resource to the terminal 20. In addition, in a case where the HARQ control is applied, the base station 10 may transmit information indicating a PSFCH resource to the terminal 20.

At step S301, the base station 10 performs an SL scheduling for the terminal 20A by transmitting DCI (Downlink Control Information) via a PDCCH. Hereinafter, for convenience, the DCI for the SL scheduling is referred to as SL scheduling DCI.

Also, at step S301, it is expected that the base station 10 also transmits, to the terminal 20A, the DCI for a DL scheduling (may be referred to as DL assignment) via the PDCCH. Hereinafter, for convenience, the DCI for the DL scheduling is referred to as DL scheduling DCI. Upon receiving the DL scheduling DCI, the terminal 20A uses a resource specified by the DL scheduling DCI to receive DL data via a PDSCH.

At steps S302 and S303, the terminal 20A uses a resource specified by the SL scheduling DCI to transmit SCI (Sidelink Control Information) via a PSCCH and SL data via a PSSCH. Note that only a resource of the PSSCH may be specified by the SL scheduling DCI. In this case, for example, the terminal 20A may use a frequency resource adjacent to a frequency resource of the PSSCH with the same time resource as a time resource of the PSSCH to transmit the SCI (PSCCH).

The terminal 20B receives the SCI (PSCCH) and the SL data (PSSCH) transmitted from the terminal 20A. The SCI received via the PSCCH includes information regarding a resource of a PSFCH for transmitting a HARQ-ACK for reception of the data from the terminal 20B.

The information regarding the resource is included in the DL scheduling DCI or the SL scheduling DCI transmitted from the base station 10 at step S301, and the terminal 20A may acquire the information regarding the resource from the DL scheduling DCI or the SL scheduling DCI, and include the acquired information into the SCI.

Alternatively, the information regarding the resource need not be included in the DCI transmitted from the base station 10, and the terminal 20A may autonomously include the information regarding the resource in the SCI, and then transmit the SCI.

At step S304, the terminal 20B uses a resource of the PSFCH specified by the received SCI to transmit a HARQ-ACK for the received data to the terminal 20A.

At step S305, the terminal 20A transmits the HARQ-ACK at a timing (for example, a timing in unit of slot) specified by the DL scheduling DCI (or the SL scheduling DCI) by using a PUCCH (Physical Uplink Control Channel) resource specified by the DL scheduling DCI (or the SL scheduling DCI), and the base station 10 receives the HARQ-ACK. A codebook of the HARQ-ACK may include the HARQ-ACK received from the terminal 20B and the HARQ-ACK for DL data. Note that the HARQ-ACK for the DL data need not be included in a case where, for example, no DL data is assigned.

Note that if HARQ control is not performed, steps S304 and S305 need not be performed.

Figure 13:
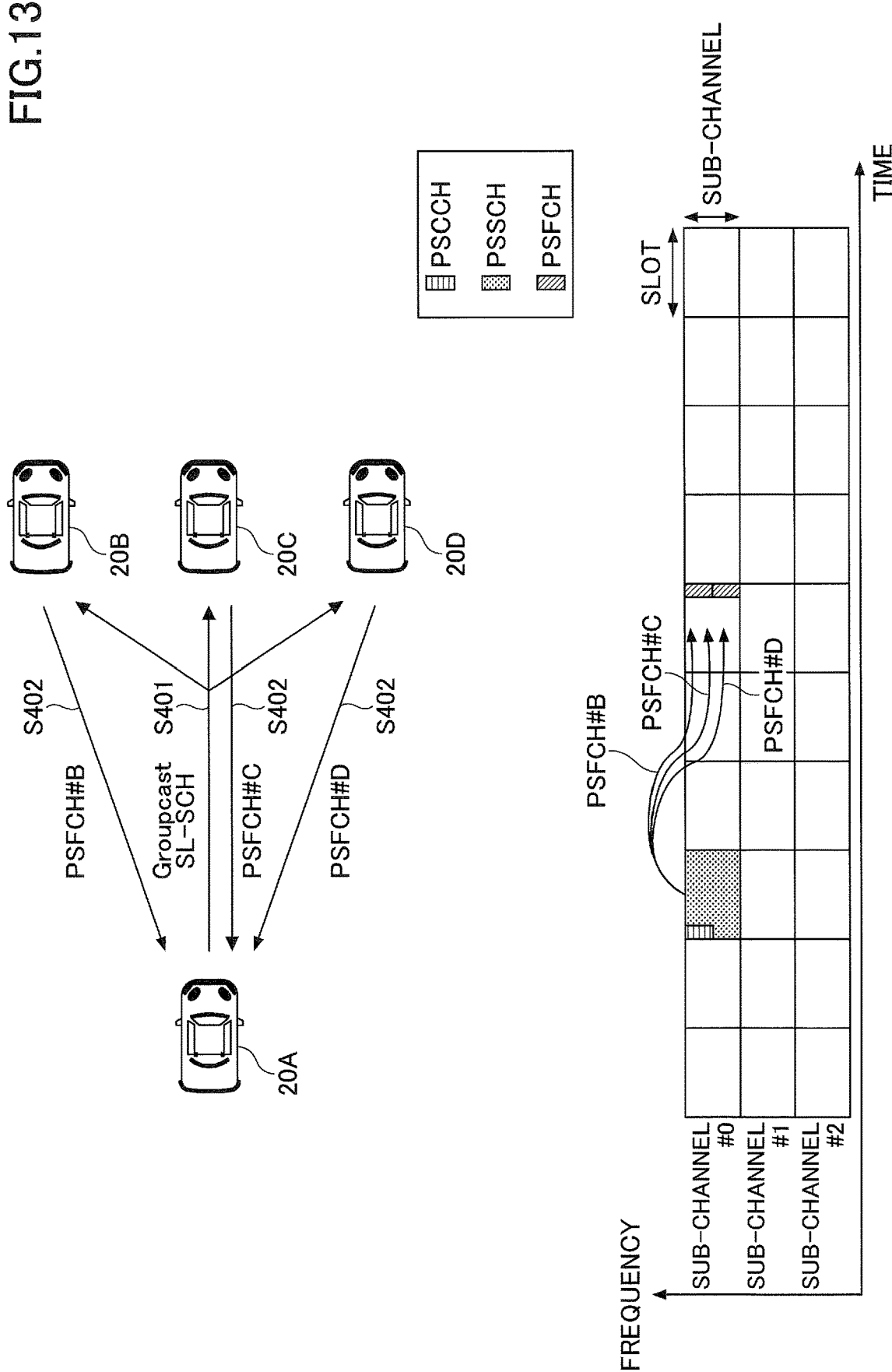
FIG. 13 is a sequence diagram illustrating an operation example (4) of the V2X.

FIG. 13 is a diagram illustrating an operation example (4) according to an embodiment of the present invention. As stated above, transmission of the HARQ response via the PSFCH is supported in the NR sidelink. Note that a format similar to PUCCH (Physical Uplink Control Channel) format 0 is available as the PSFCH format. In other words, in the PSFCH format, the PRB (Physical Resource Block) size is equal to 1, and the ACK and the NACK may be a sequence-based format that can be distinguished based on the sequence difference. The PSFCH format is not limited to the above. A resource of the PSFCH may be placed at the last symbol of a slot or at the multiple symbols at the end of a slot. Also, a cycle N for the PSFCH resource may be configured or may be defined in advance. The cycle N may be configured or may be defined, in unit of slot.

In FIG. 13, the vertical axis corresponds to the frequency domain, and the horizontal axis corresponds to the time domain. The PSCCH may be placed at the first symbol of a slot, at multiple symbols starting from the first symbol of a slot, or at multiple symbols starting from a symbol other than the first symbol. The PSFCH may be placed at the last symbol of a slot, or at multiple symbols at the end of a slot. In the example illustrated in FIG. 13, three sub-channels are configured in a resource pool, and the two PSFCHs are placed at the third slot from the slot where the PSSCH is placed. The arrow from the PSSCH to the PSFCH shows an example of the PSFCH associated with the PSSCH.

In a case where the HARQ response in NR-V2X groupcast is option 2 of transmitting the ACK or NACK, a resource to be used for transmission and reception of the PSFCH must be determined. As illustrated in FIG. 13, at step S401, the terminal 20A serving as the transmitting terminal 20 performs groupcast to the terminals 20B, 20C and 20D serving as the receiving terminal 20 via an SL-SCH. Then, at step S402, the terminals 20B, 20C, and 20D use a PSFCH #B, a PSFCH #C, and a PSFCH #D, respectively, to transmit the HARQ responses to the terminal 20A. Here, as illustrated in the example in FIG. 13, in a case where the number of available PSFCH resources is less than the number of receiving terminals 20 belonging to a group, it must be determined how to assign the PSFCH resources. Note that the transmitting terminal 20 may have the number of receiving terminals 20 in the groupcast.

Here, power saving is being discussed as a sidelink enhancement for NR sidelink. Random resource selection and partial sensing for the LTE and resource assignment mode 2 for the NR are used as a baseline, and details of the DRX for sidelink and details of the DRX for sidelink for the case of the DRX being applied to downlink are being discussed.

Figure 14:
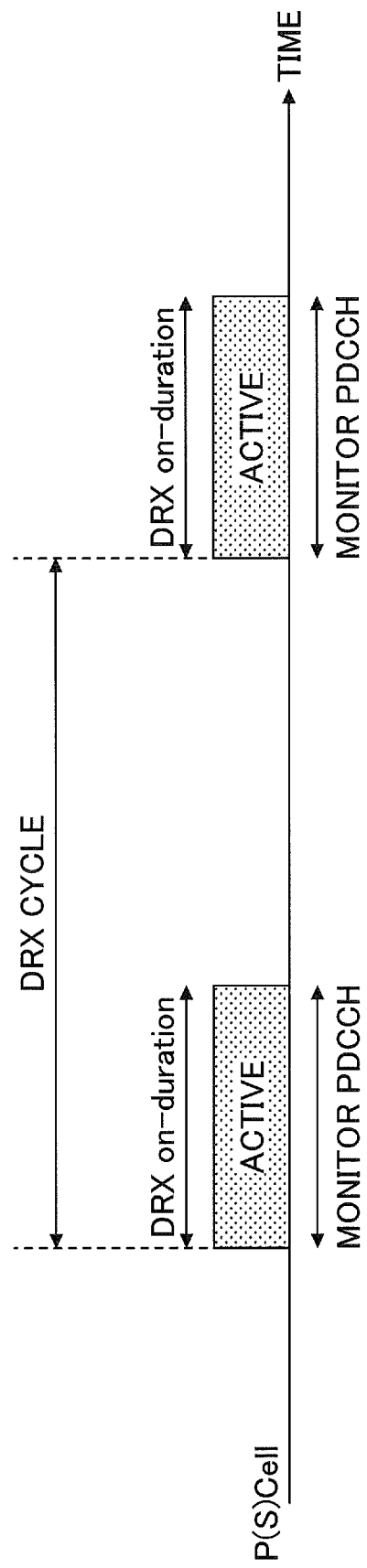
FIG. 14 is a diagram illustrating an example of DRX.

FIG. 14 is a diagram illustrating an example of DRX. In the NR, the DRX for downlink is defined in the technical specifications. In the CDRX (Connected DRX), as illustrated in FIG. 14, the terminal 20 monitors a PDCCH during DRX on-duration. The state of the terminal 20 monitoring the PDCCH may be referred to as "active". The period from the starting time point of a DRX on-duration to the starting time point of the subsequent DRX on-duration may be referred to as a DRX cycle. Also, the DRX-applied communication may be performed in a PCell (Primary Cell), an SCell (Secondary Cell) or a PSCell (Primary SCG Cell).

Figure 15:
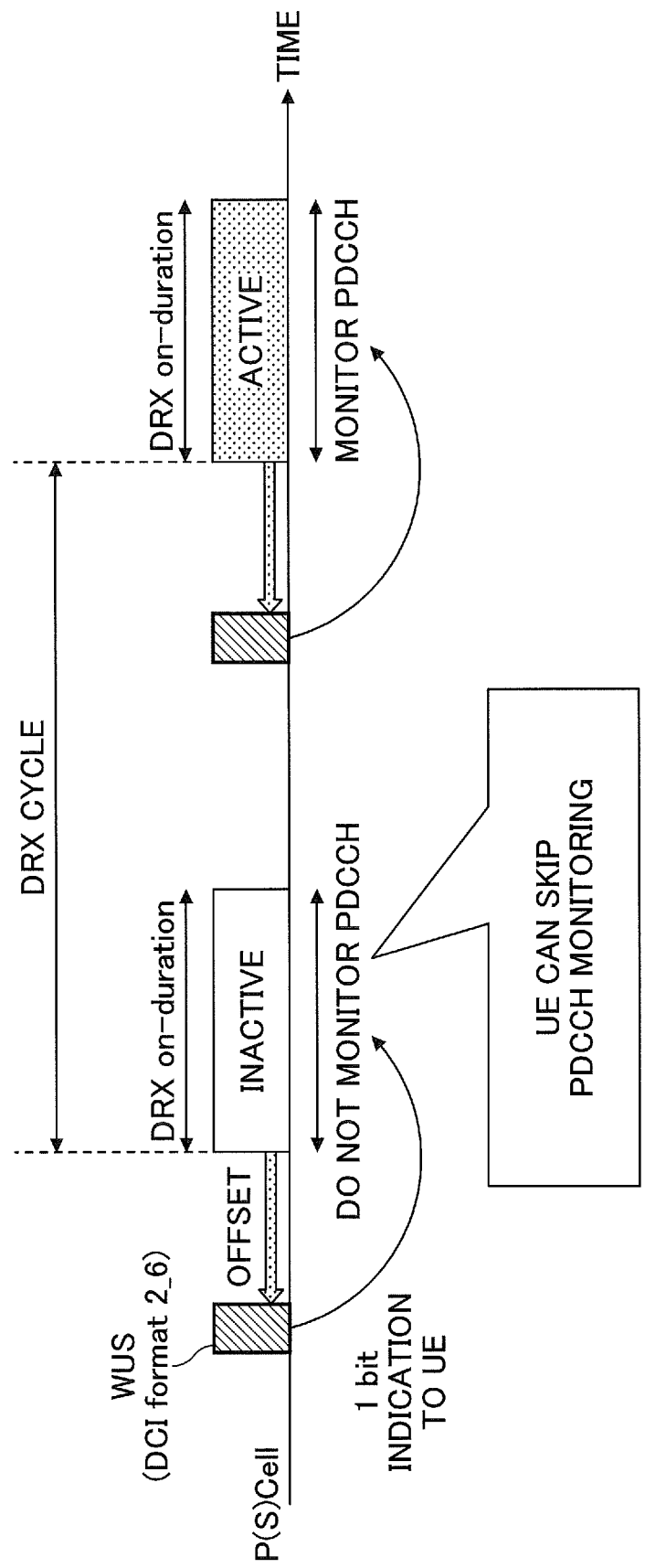
FIG. 15 is a diagram illustrating an example of WUS.

FIG. 15 is a diagram illustrating an example of WUS. In the DRX for downlink in the NR, a WUS (Wake-Up Signal) may be used to indicate whether to monitor a PDCCH during the subsequent DRX on-duration. Also, the WUS itself may be a signal transmitted via the PDCCH. As illustrated in FIG. 15, a monitoring occasion for monitoring the WUS is configured to a location preceding the DRX on-duration in a time domain by a predetermined offset. This offset may be configured based on the available processing time of the terminal 20.

As illustrated in FIG. 15, in a case where "inactive" is indicated by the WUS, that is, in a case where no data for transmission and reception is present for the target terminal 20, the terminal 20 can skip the monitoring during the subsequent DRX on-duration and can immediately transition into a sleep mode. The WUS may be an indication of one bit according to DCI format 2_6. On the other hand, in a case where "active" is indicated by the WUS, that is, in a case where data for transmission and reception is present for the target terminal 20, the terminal 20 performs the monitoring during the subsequent DRX on-duration. Note that a default operation of the terminal 20 may be configurable under assumption of a case in which the WUS cannot be detected. For example, the default operation corresponds to a case in which misdetection of the WUS occurs, for example.

A higher power saving effect can be expected by applying the DRX using the above-stated WUS to sidelink. With respect to the above, no detailed method for using the WUS in sidelink has been specified.

Accordingly, upon receiving a specific signal, the terminal 20 may perform a reception operation for sidelink. For example, the specific signal may be the WUS via a PSCCH in sidelink. For example, the WUS may be SCI format 0_1, and a reserved bit in the conventional technique may be used, or an existing field may be used. Also, the specific signal may be the WUS via a PDCCH in downlink. Note that, in the following description, the specific signal is described as, but not limited to, the WUS. Also, the specific signal may be referred to as an activation signal.

The WUS directed to all the terminals 20 may be transmitted and received. In the case where the WUS directed to all the terminal 20 is transmitted and received in sidelink, operations 1) to 5) below may be performed.

1) A monitoring occasion and a resource common to all the terminals 20 are configured, and the terminals 20 may try to receive the WUS by using only the monitoring occasion. The monitoring resource may be placed in a dedicated sub-channel or in a sub-channel shared with data transmission and reception. Also, in a case where two different sub-channels are present, the monitoring resource may be located in a sub-channel of a smaller size. The monitoring occasion may be configured or predetermined as a specific time cycle.

2) In the WUS occasion, any terminal 20 may be enabled to transmit the WUS.

3) The WUS may include information or indication for indicating that "all the terminals 20 are targets".

4) The terminal 20 that has received the WUS may perform a reception operation of a PSCCH with respect to a specific time and/or frequency resource.

5) The terminal 20 that has transmitted the WUS may perform a PSCCH reception operation with respect to the specific time and/or frequency resource. Because the terminal 20 that has transmitted the WUS may have failed to receive the WUS transmitted from another terminal 20 due to half duplex communication, the terminal 20 may perform a PSCCH reception operation.

In a case where the WUS directed to all the terminals 20 is transmitted and received in downlink, operations of 1) and 2) below may be performed.

1) The WUS may be indicated by using a group-common PDCCH.

2) The WUS may be indicated by using the same format as DCI format 2_6. Furthermore, a sidelink WUS and a downlink WUS may be distinguished from each other by using a RNTI.

Transmission and reception of the WUS directed to all the terminals 20 allows all the terminals 20 to perform a common reception operation and a common transmission operation.

The WUS directed to the terminals 20 within a group may be transmitted and received. In a case where the WUS directed to the terminals 20 within the group is transmitted and received in sidelink, operations 1) to 5) below may be performed.

1) A monitoring occasion and a resource common to all the terminals 20 or common to the terminals 20 within a group may be configured, and the terminals 20 may try to receive the WUS by using only the monitoring occasion. The monitoring resource may be located in a dedicated sub-channel or in a sub-channel shared with data transmission and reception. Also, in a case where two different sub-channels are present, the monitoring resource may be located in the sub-channel of a smaller size. The monitoring occasion may be configured or predetermined as a specific time cycle.

2) In the WUS occasion, any terminal 20 may be enabled to transmit the WUS.

3) The WUS may include information or indication for indicating a group (for example, a destination ID).

4) Among the terminals 20 that have received the WUS, a terminal 20 belonging to the target group may perform a PSCCH reception operation with respect to a specific time and/or frequency resource.

5) The terminal 20 that has transmitted the WUS may perform a PSCCH reception operation with respect to the specific time and/or frequency resource. Because the terminal 20 that has transmitted the WUS may have failed to receive the WUS transmitted from another terminal 20 due to half duplex communication, the terminal 20 may perform the PSCCH reception operation.

In a case where the WUS directed to the terminals 20 within a group is transmitted and received in downlink, operations of 1) and 2) below may be performed.

1) The WUS may be indicated by using a group-common PDCCH.

2) The WUS may be indicated by using the same format as DCI format 2_6. Furthermore, a sidelink WUS and a downlink WUS may be distinguished from each other by using a RNTI.

Transmission and reception of the WUS directed to the terminals 20 within the group may allow only the terminals 20 within the transmission-target group to perform a reception operation, and other terminals 20 can save power consumption.

The WUS directed to a specific terminal 20 may be transmitted and received. In a case where the WUS directed to the specific terminal 20 is transmitted and received in sidelink, operations 1) to 5) below may be performed.

1) A monitoring occasion and a resource common to all the terminals 20 or dedicated to a specific terminal 20 may be configured, and the terminals 20 may try to receive the WUS by using only the monitoring occasion. The monitoring resource may be located in a dedicated sub-channel or a sub-channel shared with data transmission and reception. Also, in a case where two different sub-channels are present, the monitoring resource may be located in the sub-channel of a smaller size. The monitoring occasion may be configured or predetermined as a specific time cycle. The monitoring occasion and resource may be configured by using an RRC signaling via sidelink. The specific terminal 20 may be a terminal 20 for which the RRC signaling via sidelink has been established with the WUS transmitting terminal 20.

2) In the WUS occasion, any terminal 20 may be enabled to transmit the WUS.

3) The WUS may include information or indication for indicating a specific terminal 20 (for example, a destination ID).

4) Among the terminals 20 that have received the WUS, the above specific terminal 20 may perform a PSCCH reception operation with respect to a specific time and/or frequency resource.

5) The terminal 20 that has transmitted the WUS may perform a PSCCH reception operation with respect to a specific time and/or frequency resource. Because the terminal 20 that has transmitted the WUS may have failed to receive the WUS transmitted from another terminal 20 due to half duplex communication, the terminal 20 may perform a PSCCH reception operation.

In a case where the WUS directed to the terminals 20 within a group is transmitted and received in downlink, operations 1) and 2) below may be performed.

1) The WUS may be indicated by using a group-common PDCCH.

2) The WUS may indicated by using the same format as DCI format 2_6. Furthermore, a sidelink WUS and a downlink WUS may be distinguished from each other by using a RNTI.

Transmission and reception of the WUS directed to the specific terminal 20 allows only the transmission-target terminal 20 to perform a reception operation, and other terminals 20 can save power consumption.

Figure 16:
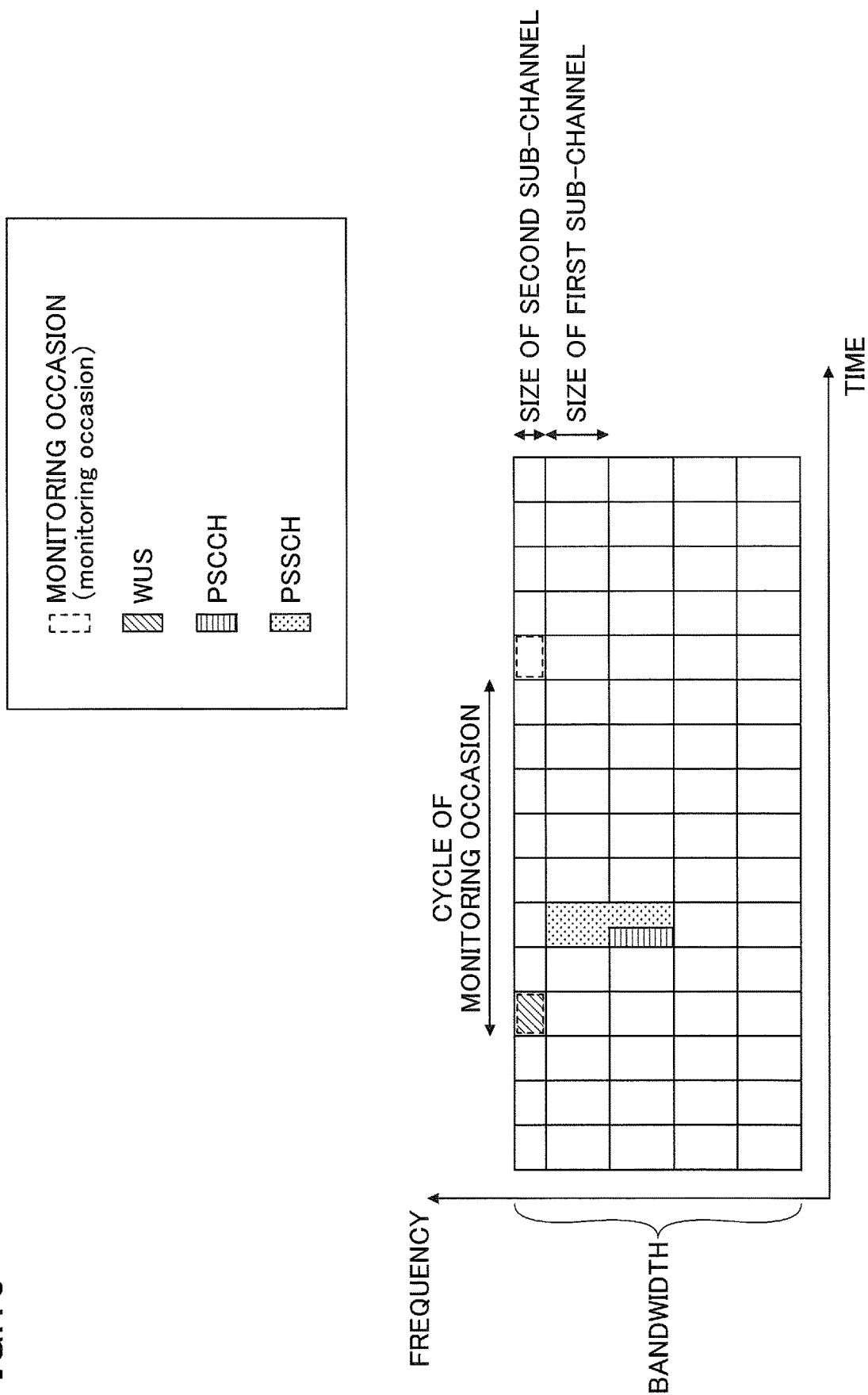
FIG. 16 is a diagram illustrating an operation example associated with the DRX according to an embodiment of the present invention.

FIG. 16 is a diagram illustrating an operation example associated with DRX according to an embodiment of the present invention. As illustrated in FIG. 16, a monitoring occasion is configured to a sidelink resource. The monitoring occasion is periodically configured to a second sub-channel as illustrated in FIG. 16. For example, a first sub-channel in which a PSCCH and a PSSCH are located, the PSCCH and the PSSCH being monitored by a WUS configured in the monitoring occasion, may be of a larger width of a frequency domain than the second sub-channel. In other words, the second sub-channel may be of a smaller width of a frequency domain than the first sub-channel.

In a case where "active" is indicated by the WUS, the terminal 20 may monitor a PDCCH during the subsequent DRX on-duration. In a case where "inactive" is indicated by the WUS, that is, in a case where no data for transmission and reception is present for the target terminal 20, the terminal 20 can skip the monitoring during the subsequent DRX on-duration and transition into a sleep mode immediately.

Figure 17:
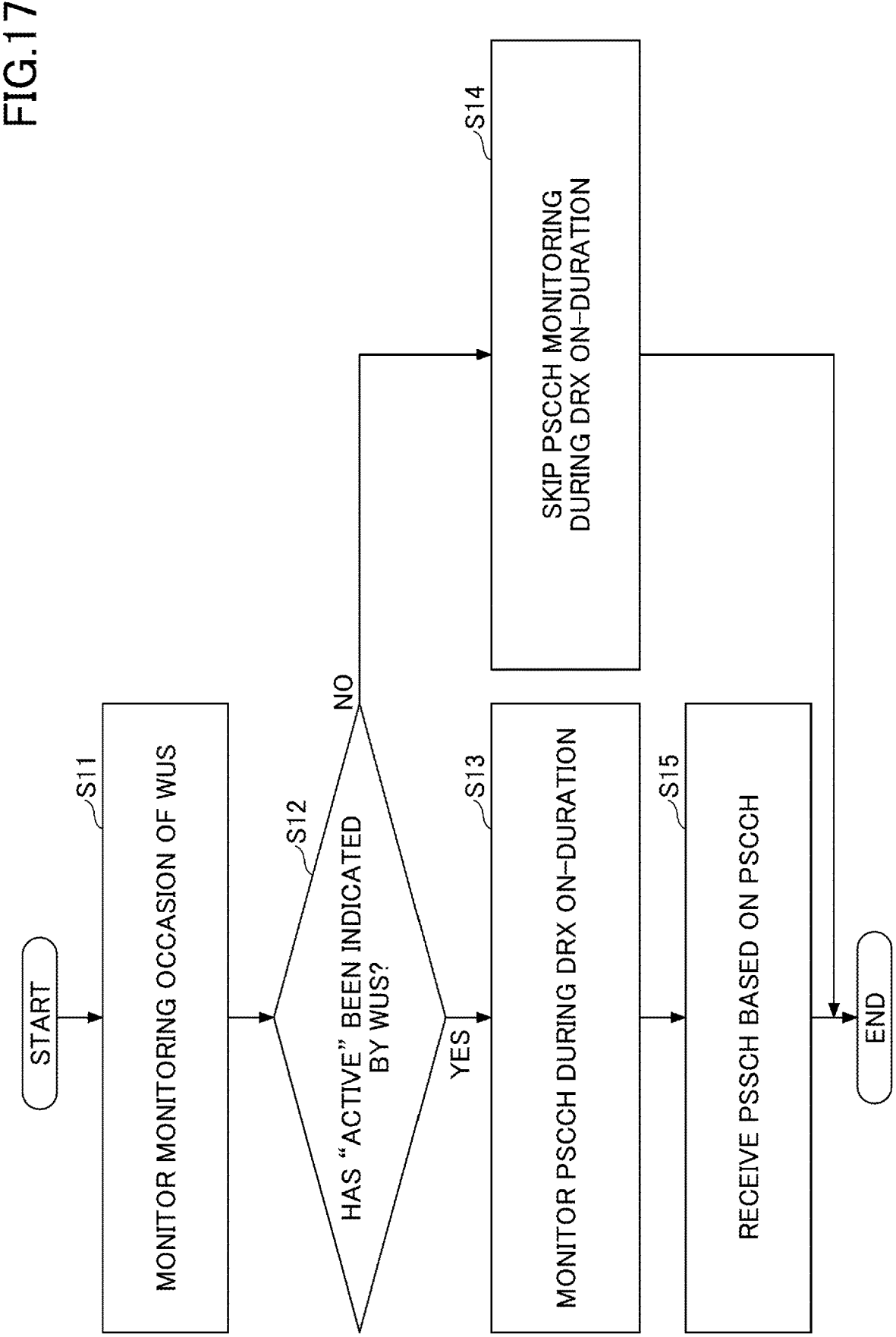
FIG. 17 is a flowchart illustrating an operation example associated with the DRX according to an embodiment of the present invention.

FIG. 17 is a flowchart illustrating an operation example associated with DRX according to an embodiment of the present invention. An operation example of the terminal 20 receiving the WUS during DRX is described with reference to FIG. 17.

At step S11, the terminal 20 monitors a monitoring occasion for the WUS. As illustrated in FIG. 16, the monitoring occasion for the WUS may be periodically configured. At step S12, the terminal 20 determines whether "active" has been indicated by the monitored WUS. In a case where "active" has been indicated, the flow proceeds to step S13, and in a case where "active" has not been indicated, that is, in a case where "inactive" has been indicated or in a case where the WUS cannot be detected, the flow proceeds to step S14. Note that in a case where the WUS cannot be detected, the terminal 20 may perform a predetermined default operation. By this default operation, the terminal 20 may perform step S13 or S14. Note that in a case where "inactive" has been indicated at step S12, the terminal 20 may transition into a sleep mode immediately.

At step S13, the terminal 20 monitors a PSCCH during DRX on-duration. Subsequently, at step S15, the terminal 20 receives a PSSCH based on the received PSCCH and ends the flow. On the other hand, at step S14, the terminal 20 skips monitoring of the PSCCH during the DRX on-duration and ends the flow.

According to the above-stated embodiments, the terminal 20 can clarify the reception operation for the case where the DRX and the WUS are applied to sidelink and perform a power saving operation.

In other words, power consumed during execution of the DRX (Discontinuous Reception) can be controlled.

(Device Arrangement)

Next, examples of functional arrangements of the base station 10 and the terminal 20 that perform operations and actions as stated above are described. The base station 10 and the terminal 20 include functions of implementing the above-stated embodiments. Note that the base station 10 and the terminal 20 each may have only a portion of the functions of the embodiments.

<Base Station 10>

Figure 18:
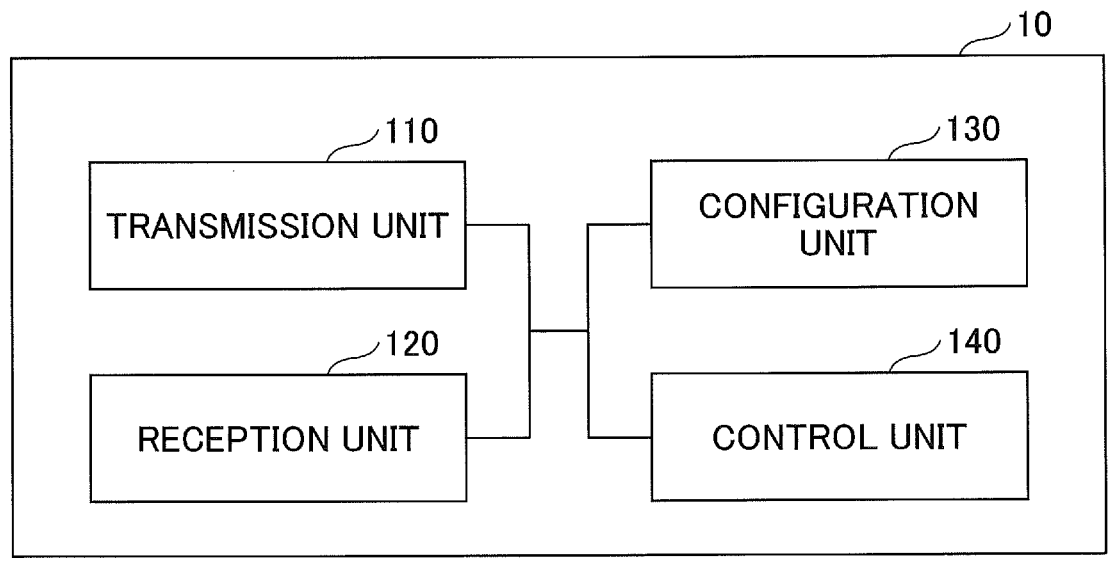
FIG. 18 is a diagram illustrating an example of functional arrangement of a base station 10 according to an embodiment of the present invention.

FIG. 18 illustrates an example of functional arrangement of the base station 10. As shown in FIG. 18, the base station 10 includes a transmission unit 110, a reception unit 120, a configuration unit 130 and a control unit 140. The functional arrangement shown in FIG. 18 is only one example. Any names may be used for functional segments and functional parts, insofar as the operation according to the embodiment of the invention can be executed.

The transmission unit 110 includes a function of generating a signal for transmission to the side of the terminal 20 and wirelessly transmitting the signal. The reception unit 120 includes a function of receiving various signals transmitted from the terminal 20 and acquiring information for upper layers from the received signals, for example. Also, the transmission unit 110 includes a function of transmitting an NR-PSS, an NR-SSS, an NR-PBCH, a DL/UL control signal, a DL reference signal or the like to the terminal 20.

The configuration unit 130 stores preconfigured configurations and various configurations for transmission to the terminal 20 in a memory device and reads them from the memory device as needed. Contents of the configurations may be configuration information associated with DRX of D2D information or the like, for example.

The control unit 140 performs operations associated with configurations for the terminal 20 to perform D2D communication as stated in conjunction with the embodiments. Also, the control unit 140 performs control associated with the DRX applied to D2D communication. Also, the control unit 140 transmits a scheduling for D2D communication and DL communication to the terminal 20 via the transmission unit 110. Also, the control unit 140 receives information associated with an HARQ acknowledgement for D2D communication and DL communication from the terminal 20 via the reception unit 120. The functional portions of the control unit 140 related to signal transmission may be included in the transmission unit 110, and the functional portions of the control unit 140 related to signal reception may be included in the reception unit 120.

<Terminal 20>

Figure 19:
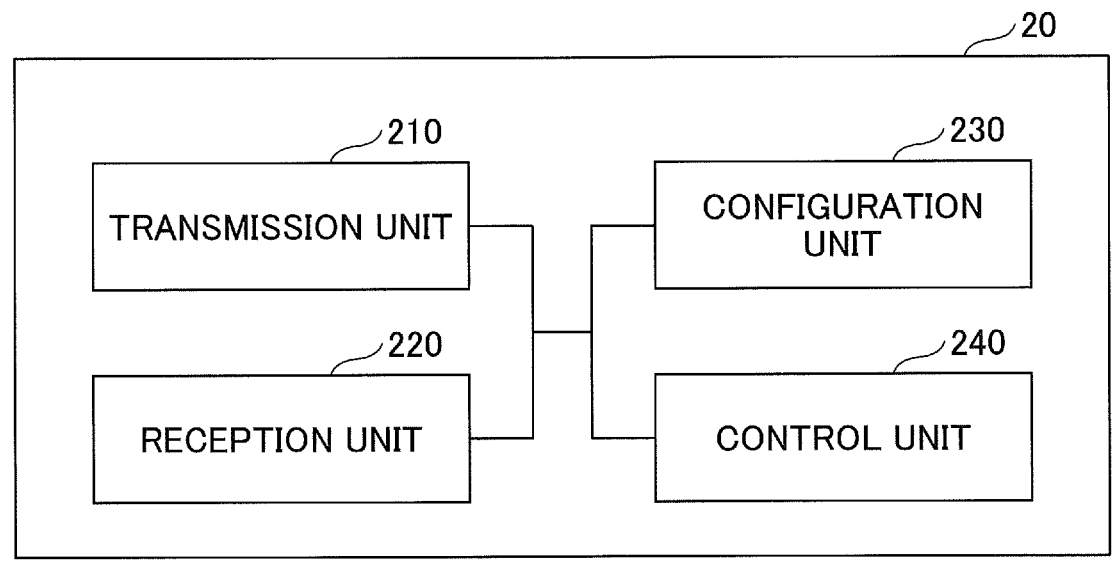
FIG. 19 is a diagram illustrating an example of functional arrangement of a terminal 20 according to an embodiment of the present invention.

FIG. 19 is a diagram illustrating an example of functional arrangement of the terminal 20 according to an embodiment of the present invention. As illustrated in FIG. 19, the terminal 20 has a transmission unit 210, a reception unit 220, a configuration unit 230 and a control unit 240. The functional arrangement shown in FIG. 19 is only one example. Any names may be used for functional segments and functional parts, insofar as the operation according to the embodiment of the invention can be executed.

The transmission unit 210 generates a transmission signal from transmission data and wirelessly transmits the transmission signal. The reception unit 220 wirelessly receives various signals and acquires signals for upper layers from the received physical layer signals. Also, the reception unit 220 has a function of receiving an NR-PSS, an NR-SSS, an NR-PBCH, a DL/UL/SL control signal or a reference signal and so on transmitted from the base station 10. Also, for example, as D2D communication, the transmission unit 210 transmits a PSCCH (Physical Sidelink Control Channel), a PSSCH (Physical Sidelink Shared Channel), a PSDCH (Physical Sidelink Discovery Channel), a PSBCH (Physical Sidelink Broadcast Channel) or the like to other terminals 20, and the reception unit 220 receives the PSCCH, the PSSCH, the PSDCH, the PSBCH or the like from other terminals 20.

The configuration unit 230 stores various configurations received at the reception unit 220 from the base station 10 or the terminal 20 in a memory device and reads them from the memory device as needed. Also, the configuration unit 230 stores preconfigured configurations. Contents of the configurations may be configuration information associated with DRX of D2D communication and so on, for example.

The control unit 240 controls D2D communication to other terminals 20 as stated above in conjunction with the embodiments. Also, the control unit 240 perform control associated with the DRX applied to D2D communication. Also, the control unit 240 performs operations associated with an HARQ for D2D communication and DL communication. Also, the control unit 240 transmits information associated with an HARQ acknowledgement for D2D communication and DL communication to other terminal 20 scheduled from the base station 10 to the base station 10. Also, the control unit 240 may perform scheduling for D2D communication for other terminals 20. Also, the control unit 240 may autonomously select a resource for use in D2D communication from a resource selection window based on sensing results. Also, the control unit 240 performs operations associated with a MCS in transmission and reception of D2D communication. The functional portion of the control unit 240 regarding signal transmission may be included in the transmission unit 210, and the functional portion of the control unit 240 regarding signal reception may be included in the reception unit 220.

(Hardware Arrangement)

The block diagrams (FIGS. 18 and 19) used for the description of the above embodiments show blocks of functional units. These functional blocks (components) are implemented by any combination of at least one of hardware and software. In addition, the implementation method of each function block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 20:
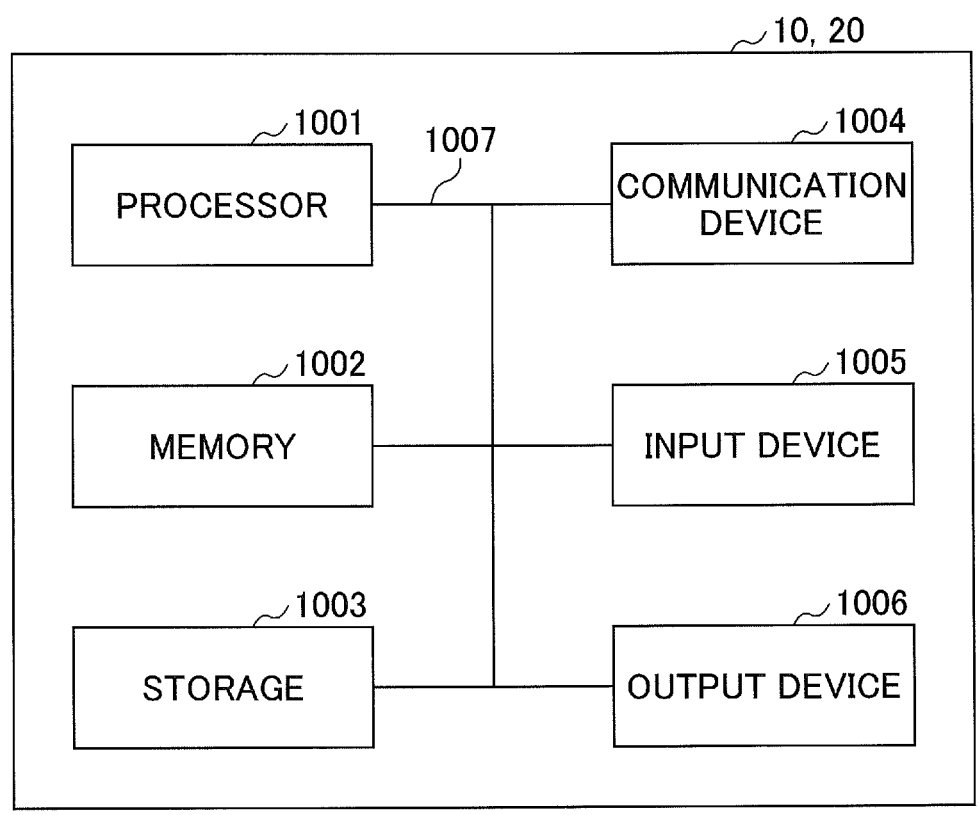
FIG. 20 is a diagram illustrating an example of hardware arrangement of the base station 10 or the terminal 20 according to an embodiment of the present invention.

For example, each of the base station 10, the terminal 20 and so on according to one embodiment of the present invention may function as a computer performing operations for a radio communication method according to the present disclosure. FIG. 20 is a diagram illustrating an example of a hardware configuration of the base station 10 and the terminal 20 according to one embodiment of the present disclosure. The base station 10 and the terminal 20 as stated above may be physically configured as a computer device including a processor 1001, a memory 1002, a storage 1003, a communication device 1004, an input device 1005, an output device 1006, a bus 1007, etc.

In the following description, the term "device" can be read as a circuit, a device, a unit, etc. The hardware configuration of the base station 10 and the terminal 20 may be configured to include one or more of the respective devices shown in the figure, or may be configured without some devices.

Each function of the base station 10 and the terminal 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, the above-stated control units 140 and 240 or the like may be implemented with the processor 1001.

Additionally, the processor 1001 reads a program (program code), a software module, data, etc., from at least one of the storage 1003 and the communication device 1004 to the memory 1002, and executes various processes according to these. As the program, a program is used which causes a computer to execute at least a part of the operations described in the above-described embodiment. For example, the control unit 140 of the base station 10 shown in FIG. 18 may be implemented by a control program that is stored in the memory 1002 and that is operated by the processor 1001. Also, for example, the control unit 240 of the terminal 20 shown in FIG. 19 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a ROM (Read Only Memory), an EPROM (Erasable Programmable ROM), an EEPROM (Electrically Erasable Programmable ROM), a RAM (Random Access Memory), etc. The memory 1002 may be referred to as a register, a cache, a main memory (main storage device), etc. The memory 1002 may store a program (program code), a software module, etc., which can be executed for implementing the radio communication method according to one embodiment of the present disclosure.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplex (FDD: Frequency Division Duplex) and time division duplex (TDD: Time Division Duplex). For example, a transceiver antenna, an amplification unit, a transceiver unit, a channel interface or the like may be implemented with the communication device 1004. The transceiver unit may have an implementation with the transmission unit and the reception unit that are physically or logically separated.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

Also, the base station 10 and the terminal 20 may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, the processor 1001 may be implemented using at least one of these hardware components.

Conclusion of the Embodiments

As stated above, according to an embodiment of the present invention, there is provided a terminal, comprising: a reception unit that monitors an activation signal at a monitoring occasion periodically configured during DRX (Discontinuous Reception); and a control unit that determines, based on a monitoring result of the activation signal, whether or not to monitor a control signal transmitted from another terminal during DRX on-duration starting after passage of an offset period from a time point of the activation signal.

According to the above arrangement, a reception operation for the case where the DRX and a WUS are applied to sidelink can be clarified, and the terminal 20 can perform a power saving operation. In other words, the power consumed during execution of DRX (Discontinuous Reception) can be controlled in a radio communication system.

In a case where the monitoring result of the activation signal indicates active, the control unit may determine to monitor the control signal transmitted from the other terminal, and the reception unit may receive a data signal transmitted from the other terminal based on the monitoring result of the activation signal, and in a case where the monitoring result of the activation signal indicates inactive, the control unit may determine not to monitor the control signal transmitted from the other terminal and transitions into a sleep mode. According to this arrangement, a reception operation for the case where the DRX and a WUS are applied to sidelink can be clarified, and the terminal 20 can perform a power saving operation.

The activation signal may be transmitted from the other terminal or a base station. According to this arrangement, the terminal 20 can use the WUS transmitted via sidelink or downlink to perform a power saving operation.

A target of the activation signal may be all terminals, a terminal in a group, or a specific terminal. According to this arrangement, the terminal 20 can use the WUS transmitted via sidelink or downlink to perform a power saving operation.

In a case where the activation signal is transmitted from the other terminal, an RRC (Radio Resource Control) connection may have been already established with the other terminal. According to this arrangement, the terminal 20 can use the WUS transmitted from another terminal that is RRC connected in sidelink to perform a power saving operation.

Also, according to an embodiment of the present invention, there is provided a communication method implemented by a terminal, comprising: a reception procedure that monitors an activation signal at a monitoring occasion periodically configured during DRX (Discontinuous Reception); and a control procedure that determines, based on a monitoring result of the activation signal, whether or not to monitor a control signal transmitted from another terminal during DRX on-duration starting after passage of an offset period from a time point of the activation signal.

According to the above arrangement, a reception operation for the case where the DRX and a WUS are applied to sidelink can be clarified, and the terminal 20 can perform a power saving operation. In other words, the power consumed during execution of DRX (Discontinuous Reception) can be controlled in a radio communication system.

Supplemental Embodiments

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station 10 and the terminal 20 have been described with the use of the functional block diagrams, but these apparatuses may be implemented by hardware, software, or a combination thereof. Each of software functioning with a processor of the base station 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (a MIB (Master Information Block) and a SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also, a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station 10 described in the present disclosure may in some cases be performed by an upper node. It is clear that, in a network that includes one or more network nodes including the base station 10, various operations performed for communication with the terminal 20 can be performed by at least one of the base station 10 and another network node other than the base station 10 (for example, a MME, a S-GW, or the like may be mentioned, but not limited thereto). In the above, the description has been made for the case where another network node other than the base station 10 is a single node as an example. However, the other network node may be a combination of a plurality of other network nodes (for example, an MME and a S-GW).

Information, signals, or the like described in the present disclosure may be output from an upper layer (or a lower layer) to a lower layer (or an upper layer). Information, signals, or the like described in the present disclosure may be input and output via a plurality of network nodes.

Information or the like that has been input or output may be stored at a predetermined location (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Also, software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Also, information, parameters, and the like described in the present disclosure may be expressed by absolute values, may be expressed by relative values with respect to predetermined values, and may be expressed by corresponding different information. For example, radio resources may be indicated by indices.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells. In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication device, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Things) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments 20 (that may be called D2D (Device-to-Device), V2X (Vehicle-to-Everything), or the like). In this case, a user equipment 20 may have above-described functions of the base station 10. In this regard, a word such as "up" or "down" may be replaced with a word corresponding to communication between terminals (for example, "side"). For example, an uplink channel, a downlink channel, or the like may be replaced with a side channel.

Similarly, a user terminal according to the present disclosure may be read as a base station. In this case, a base station may have above-described functions of the user terminal.

The term "determining" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "Determining" may be read as "assuming", "expecting", "considering", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be a physical one, may be a logical one, or may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "based on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above-described apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of numerology.

The numerology may be a communication parameter that is applied to at least one of transmission and reception of a signal or a channel. The numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in a frequency domain, a specific windowing processing performed by a transceiver in a time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on the numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit for transmitting a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, a normal TTI, a subframe, and the like) may be read as TTI having a time length exceeding 1 ms, and a short TTI (for example, a shortened TTI) may be read as a TTI having a TTI length less than the TTI length of the long TTI and equal to or more than 1 ms.

A resource block (RB) is a resource assignment unit in terms of a time domain and a frequency domain and may include one or a plurality of consecutive subcarriers in terms of frequency domain. The number of subcarriers included in an RB may be the same regardless of the numerology, and, for example, may be 12. The number of subcarriers included in a RB may be determined based on the numerology.

Also, in terms of the time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

Also, a resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for certain numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. One or a plurality of BWPs may be set in 1 carrier for the terminal 20.

At least one of configured BWPs may be active, and a terminal 20 need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following the article is of a plural form.

Throughout the present disclosure, an expression that "A and B are different" may mean that "A and B are different from each other". Also, this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

Note that a WUS according to this disclosure is one example of an activation signal. A PSCCH or a PDCCH is an example of a control signal. A PSSCH is one example of a data signal.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

LIST OF REFERENCE SYMBOLS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Memory
1003 Storage
1004 Communication device
1005 Input device
1006 Output device

The invention claimed is:

1. A terminal, comprising:
   a transceiver that monitors an activation signal at a monitoring occasion periodically configured during DRX (Discontinuous Reception); and
   a processor that determines, based on a monitoring result of the activation signal, whether or not to monitor a control signal transmitted from another terminal during DRX on-duration starting after passage of an offset period from a time point of the activation signal,
   wherein in a case where the activation signal is transmitted from the other terminal, an RRC (Radio Resource Control) connection has been already established with the other terminal.

2. The terminal as claimed in claim 1, wherein,
   in a case where the monitoring result of the activation signal indicates active, the processor determines to monitor the control signal transmitted from the other terminal, and the transceiver receives a data signal transmitted from the other terminal based on the monitoring result of the activation signal; and
   in a case where the monitoring result of the activation signal indicates inactive, the processor determines not to monitor the control signal transmitted from the other terminal and transitions into a sleep mode.

3. The terminal as claimed in claim 2, wherein the activation signal is transmitted from the other terminal or is transmitted from a base station.

4. The terminal as claimed in claim 3, wherein a target of the activation signal is all terminals, a terminal in a group, or a specific terminal.

5. A communication method implemented by a terminal, the communication method comprising:
   monitoring an activation signal at a monitoring occasion periodically configured during DRX (Discontinuous Reception); and
   determining, based on a monitoring result of the activation signal, whether or not to monitor a control signal transmitted from another terminal during DRX on-duration starting after passage of an offset period from a time point of the activation signal,
   wherein in a case where the activation signal is transmitted from the other terminal, an RRC (Radio Resource Control) connection has been already established with the other terminal.

* * * * *